United States Patent
Hodgdon et al.

(10) Patent No.: US 9,778,878 B2
(45) Date of Patent: Oct. 3, 2017

(54) METHOD AND SYSTEM FOR LIMITING WRITE COMMAND EXECUTION

(71) Applicant: SanDisk Technologies LLC, Plano, TX (US)

(72) Inventors: John G. Hodgdon, Chandler, AZ (US); Ryan R. Jones, Mesa, AZ (US); James M. Higgins, Chandler, AZ (US)

(73) Assignee: SanDisk Technologies LLC, Plano, TX (US)

( * ) Notice: Subject to any disclaimer, the term of this patent is extended or adjusted under 35 U.S.C. 154(b) by 97 days.

(21) Appl. No.: 14/883,540

(22) Filed: Oct. 14, 2015

(65) Prior Publication Data

US 2016/0313944 A1     Oct. 27, 2016

Related U.S. Application Data

(60) Provisional application No. 62/151,348, filed on Apr. 22, 2015.

(51) Int. Cl.
   *G06F 3/06* (2006.01)
   *G06F 12/02* (2006.01)

(52) U.S. Cl.
   CPC ............ *G06F 3/0659* (2013.01); *G06F 3/061* (2013.01); *G06F 3/0613* (2013.01);
   (Continued)

(58) Field of Classification Search
   None
   See application file for complete search history.

(56) References Cited

U.S. PATENT DOCUMENTS

4,586,167 A    4/1986    Fujishima et al.
5,559,988 A    9/1996    Durante et al.
(Continued)

FOREIGN PATENT DOCUMENTS

EP    0 376 285 A2    7/1990
WO    WO 2012/083308    6/2012

OTHER PUBLICATIONS

Atmel Data-sheet, "9-to-bit Selectable, ±0.5° C. Accurate Digital Temperature Sensor with Nonvolatile Registers and Serial EEPROM" www.atmel.com/images/Atmel-8854-DTS-AT30TSE752A-754A-758A-Datasheet.pdf, Atmel Data-sheet, Mar. 1, 2011,—Atmel-8854-DTS-AT30TSE752A-754A-758A-Datasheet_102014, 57 pages.
(Continued)

*Primary Examiner* — Kaushikkumar Patel
(74) *Attorney, Agent, or Firm* — Brinks Gilson & Lione

(57) ABSTRACT

Methods, systems and/or devices are used for limiting write command execution in a storage device comprising a set of non-volatile memory devices. In one aspect, the method includes (1) accessing in a holding queue host-specified write commands specified by a host system, each of the host-specified write commands specifying a number of pages to be written to the set of non-volatile memory devices; (2) in accordance with a determination that throttling is enabled: (3) determining a limit number of pages for a current throttle period in accordance with a throttle rate, the throttle rate being a maximum write rate for executing host-specified write commands; and (4) during the current throttle period, moving from the holding queue to a pending queue, for execution by the set of non-volatile memory devices, host-specified write commands whose total specified number of pages does not exceed the limit number of pages.

24 Claims, 7 Drawing Sheets

(52) U.S. Cl.
CPC .......... *G06F 3/0647* (2013.01); *G06F 3/0652* (2013.01); *G06F 3/0679* (2013.01); *G06F 3/0688* (2013.01); *G06F 12/0246* (2013.01)

(56) References Cited

U.S. PATENT DOCUMENTS

| | | |
|---|---|---|
| 5,909,559 A | 6/1999 | So |
| 6,247,136 B1 | 6/2001 | MacWilliams et al. |
| 6,292,410 B1 | 9/2001 | Yi et al. |
| 6,401,213 B1 | 6/2002 | Jeddeloh |
| 6,449,709 B1 | 9/2002 | Gates |
| 7,969,809 B2 | 6/2011 | Ben-Rubi |
| 8,010,738 B1 * | 8/2011 | Chilton ................. G11C 16/349 711/103 |
| 8,122,202 B2 | 2/2012 | Gillingham |
| 8,213,255 B2 | 7/2012 | Hemink et al. |
| 8,255,618 B2 | 8/2012 | Borchers et al. |
| 8,321,627 B1 | 11/2012 | Norrie et al. |
| 8,429,498 B1 | 4/2013 | Anholt et al. |
| 8,479,080 B1 | 7/2013 | Shalvi et al. |
| 8,539,139 B1 * | 9/2013 | Morris .................... G06F 13/00 365/185.33 |
| 8,595,590 B1 | 11/2013 | Vojcic et al. |
| 8,775,720 B1 | 7/2014 | Meyer et al. |
| 8,825,967 B2 | 9/2014 | Hong Beom |
| 8,874,836 B1 | 10/2014 | Hayes et al. |
| 8,886,872 B1 | 11/2014 | Norrie |
| 8,924,661 B1 | 12/2014 | Shachar et al. |
| 8,984,376 B1 | 3/2015 | Norrie |
| 9,128,825 B1 * | 9/2015 | Albrecht ............. G06F 12/0246 |
| 9,170,876 B1 | 10/2015 | Bates et al. |
| 9,176,971 B2 | 11/2015 | Shapiro |
| 9,214,965 B2 | 12/2015 | Fitzpatrick et al. |
| 2003/0115403 A1 | 6/2003 | Bouchard et al. |
| 2003/0122834 A1 | 7/2003 | Mastronarde et al. |
| 2004/0117441 A1 | 6/2004 | Liu et al. |
| 2005/0144361 A1 * | 6/2005 | Gonzalez ............ G06F 12/0246 711/103 |
| 2005/0248992 A1 | 11/2005 | Hwang et al. |
| 2007/0002629 A1 | 1/2007 | Lee et al. |
| 2007/0156998 A1 | 7/2007 | Gorobets |
| 2007/0233937 A1 | 10/2007 | Coulson et al. |
| 2008/0140914 A1 | 6/2008 | Jeon |
| 2008/0147994 A1 | 6/2008 | Jeong et al. |
| 2008/0235466 A1 | 9/2008 | Traister |
| 2008/0235480 A1 | 9/2008 | Traister |
| 2008/0295094 A1 | 11/2008 | Korupolu et al. |
| 2009/0168525 A1 | 7/2009 | Olbrich et al. |
| 2009/0177943 A1 | 7/2009 | Silvus et al. |
| 2009/0222627 A1 | 9/2009 | Reid |
| 2009/0282191 A1 | 11/2009 | Depta |
| 2010/0005217 A1 | 1/2010 | Jeddeloh |
| 2010/0014364 A1 | 1/2010 | Laberge et al. |
| 2010/0082879 A1 * | 4/2010 | McKean ................ G06F 3/0611 711/103 |
| 2010/0165730 A1 | 7/2010 | Sommer et al. |
| 2010/0174845 A1 | 7/2010 | Gorobets et al. |
| 2010/0174853 A1 | 7/2010 | Lee et al. |
| 2010/0220509 A1 | 9/2010 | Sokolov et al. |
| 2010/0250874 A1 | 9/2010 | Farrell et al. |
| 2011/0113204 A1 | 5/2011 | Henriksson et al. |
| 2011/0138100 A1 | 6/2011 | Sinclair |
| 2011/0235434 A1 | 9/2011 | Byom et al. |
| 2011/0252215 A1 | 10/2011 | Franceschini et al. |
| 2011/0264851 A1 | 10/2011 | Jeon et al. |
| 2011/0302474 A1 | 12/2011 | Goss et al. |
| 2012/0030408 A1 | 2/2012 | Flynn et al. |
| 2012/0047317 A1 | 2/2012 | Yoon et al. |
| 2012/0159070 A1 | 6/2012 | Baderdinni et al. |
| 2012/0198129 A1 | 8/2012 | Van Aken et al. |
| 2012/0224425 A1 | 9/2012 | Fai et al. |
| 2012/0278530 A1 | 11/2012 | Ebsen |
| 2012/0324180 A1 * | 12/2012 | Asnaashari ............ G06F 13/161 711/155 |
| 2013/0007380 A1 | 1/2013 | Seekins et al. |
| 2013/0070507 A1 | 3/2013 | Yoon |
| 2013/0111112 A1 * | 5/2013 | Jeong ................... G06F 13/1689 711/103 |
| 2013/0111289 A1 | 5/2013 | Zhang et al. |
| 2013/0111290 A1 | 5/2013 | Zhang et al. |
| 2013/0132650 A1 | 5/2013 | Choi et al. |
| 2013/0182506 A1 | 7/2013 | Melik-Martirosian |
| 2013/0219106 A1 | 8/2013 | Vogan et al. |
| 2013/0232290 A1 | 9/2013 | Ish et al. |
| 2013/0254498 A1 | 9/2013 | Adachi et al. |
| 2013/0262745 A1 * | 10/2013 | Lin ........................ G06F 3/061 711/103 |
| 2013/0297894 A1 | 11/2013 | Cohen et al. |
| 2013/0346805 A1 | 12/2013 | Sprouse et al. |
| 2014/0006688 A1 | 1/2014 | Yu et al. |
| 2014/0013026 A1 * | 1/2014 | Jannyavula Venkata ............. G06F 12/0246 711/103 |
| 2014/0047170 A1 | 2/2014 | Cohen et al. |
| 2014/0075100 A1 | 3/2014 | Kaneko et al. |
| 2014/0143637 A1 | 5/2014 | Cohen et al. |
| 2014/0173239 A1 | 6/2014 | Schushan |
| 2014/0229655 A1 | 8/2014 | Goss et al. |
| 2014/0229656 A1 | 8/2014 | Goss et al. |
| 2014/0241071 A1 | 8/2014 | Goss et al. |
| 2014/0244897 A1 | 8/2014 | Goss et al. |
| 2014/0244899 A1 * | 8/2014 | Schmier ................ G06F 3/0616 711/103 |
| 2014/0258598 A1 | 9/2014 | Canepa et al. |
| 2014/0281833 A1 | 9/2014 | Kroeger et al. |
| 2014/0310241 A1 | 10/2014 | Goyen |
| 2014/0379988 A1 | 12/2014 | Lyakhovitskiy et al. |
| 2015/0067172 A1 | 3/2015 | Ashokan et al. |
| 2015/0074487 A1 | 3/2015 | Patapoutian et al. |
| 2015/0095558 A1 | 4/2015 | Kim et al. |
| 2015/0113206 A1 | 4/2015 | Fitzpatrick et al. |
| 2015/0186278 A1 | 7/2015 | Jayakumar et al. |
| 2015/0234612 A1 | 8/2015 | Himelstein et al. |
| 2015/0261473 A1 * | 9/2015 | Matsuyama .......... G06F 3/0625 711/103 |
| 2015/0262632 A1 | 9/2015 | Shelton et al. |
| 2015/0301749 A1 | 10/2015 | Seo et al. |
| 2015/0331627 A1 | 11/2015 | Kwak |
| 2016/0026386 A1 | 1/2016 | Ellis et al. |
| 2016/0034194 A1 | 2/2016 | Brokhman et al. |
| 2016/0062699 A1 | 3/2016 | Samuels et al. |
| 2016/0070493 A1 | 3/2016 | Oh et al. |
| 2016/0071612 A1 * | 3/2016 | Takizawa .................. G11C 7/04 365/185.11 |
| 2016/0117099 A1 | 4/2016 | Prins et al. |
| 2016/0117102 A1 | 4/2016 | Hong et al. |
| 2016/0117105 A1 | 4/2016 | Thangaraj et al. |
| 2016/0117252 A1 | 4/2016 | Thangaraj et al. |
| 2016/0170671 A1 | 6/2016 | Huang |
| 2016/0170831 A1 | 6/2016 | Lesatre et al. |
| 2016/0179403 A1 | 6/2016 | Kurotsuchi et al. |
| 2016/0210060 A1 | 7/2016 | Dreyer |
| 2016/0299689 A1 | 10/2016 | Kim et al. |
| 2016/0299699 A1 | 10/2016 | Vanaraj et al. |
| 2016/0299704 A1 | 10/2016 | Vanaraj et al. |
| 2016/0299724 A1 | 10/2016 | Vanaraj et al. |
| 2016/0342344 A1 | 11/2016 | Kankani et al. |
| 2016/0342345 A1 | 11/2016 | Kankani et al. |
| 2016/0371394 A1 | 12/2016 | Shahidi et al. |

OTHER PUBLICATIONS

Seagate Technology, "SCSI Commands Reference Manual, Rev. C", Product Manual dated Apr. 2010, pp. 211-214.

Tanenbaum, "Structured Computer Organization", 3rd edition 1990, section 1.4, p. 11, 3 pages.

International Search Report and Written Opinion dated Sep. 8, 2016, received in International Patent Application No. PCT/US2016/036716, which corresponds to U.S. Appl. No. 14/925,945, 13 pages (Ellis).

(56) References Cited

OTHER PUBLICATIONS

International Search Report and Written Opinion dated Nov. 18, 2015, received in International Patent Application No. PCT/US2015/039552 which corresponds to U.S. Appl. No. 14/559,183, 11 pages (Ellis).

International Search Report and Written Opinion dated Jul. 4, 2016, received in International Patent Application No. PCT/US2016/028477, which corresponds to U.S. Appl. No. 14/883,540, 11 pages (Hodgdon).

International Search Report and Written Opinion dated Nov. 9, 2015, received in International Patent Application No. PCT/US2015/053551, which corresponds to U.S. Appl. No. 14/668,690, 12 pages (Thangaraj).

International Search Report and Written Opinion dated Nov. 11, 2015, received in International Patent Application No. PCT/US2015/053582, which corresponds to U.S. Appl. No. 14/659,493, 12 pages (Prins).

* cited by examiner

METHOD AND SYSTEM FOR LIMITING WRITE COMMAND EXECUTION

RELATED APPLICATIONS

This application claims priority to U.S. Provisional Patent Application No. 62/151,348, filed Apr. 22, 2015, which is hereby incorporated by reference in its entirety.

TECHNICAL FIELD

The disclosed embodiments relate generally to memory systems, and in particular, to limiting write command execution in a non-volatile memory system (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Since the host write rate of the non-volatile memory may vary from one time period to another, it is important to have a write command execution process that efficiently handles such host write rate variations.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable limiting write command execution in non-volatile memory. In one aspect, host-specified write commands are accessed in a holding queue. In accordance with a determination that throttling is enabled, a limit number of pages for a current time period (sometimes called a throttle period) is determined in accordance with a throttle rate. During the current time period, host-specified write commands whose total specified number of pages does not exceed the limit number of pages are moved from the holding queue to a pending queue for execution by the non-volatile memory devices.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
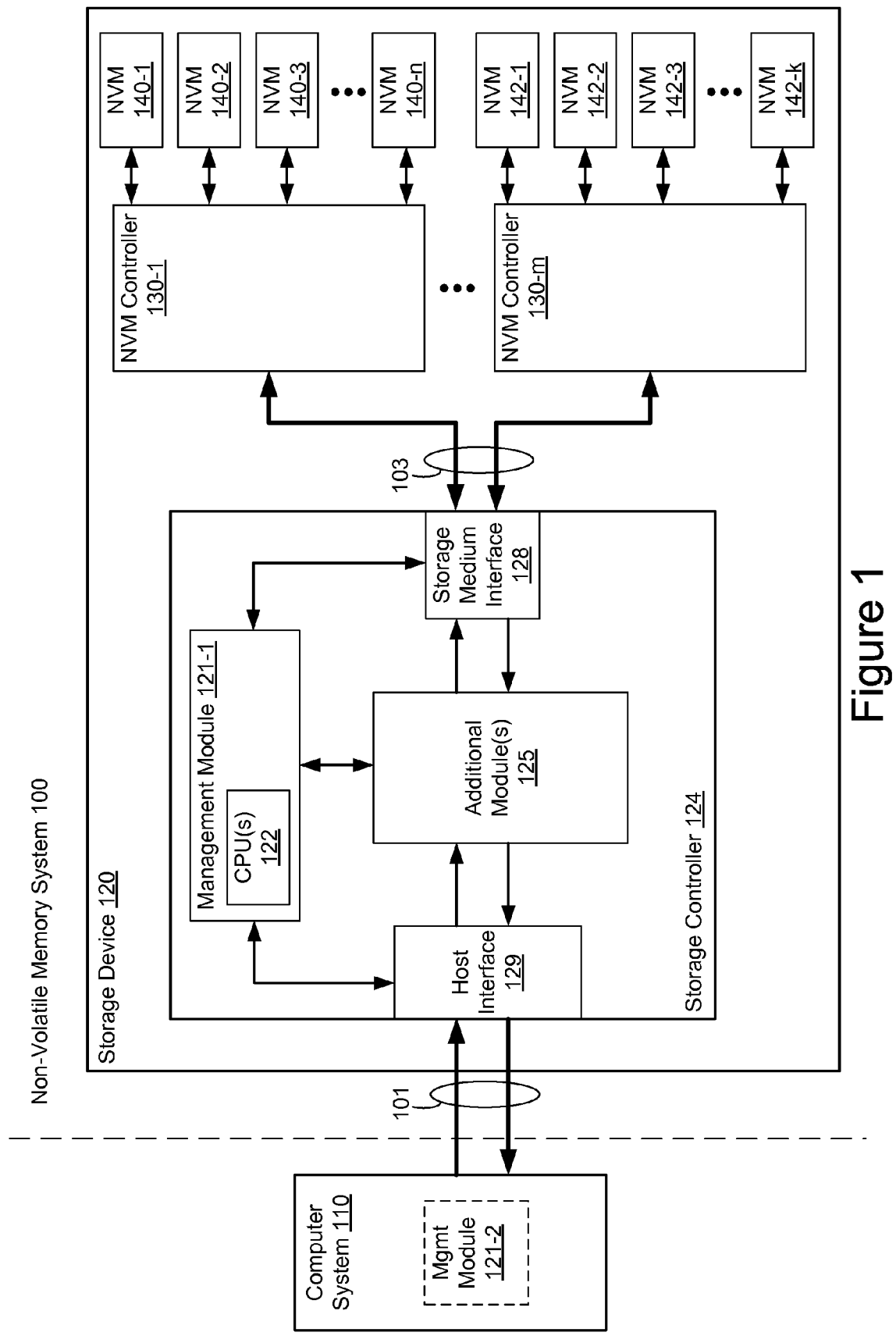
FIG. 1 is a block diagram illustrating an implementation of a non-volatile memory system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods, and/or devices used to limit the execution of write commands in a non-volatile memory system (e.g., non-volatile memory system (NVM) system 100, FIG. 1).

(A1) More specifically, some embodiments include a method of operation in a non-volatile memory system. In some embodiments, the method includes: (1) accessing in a holding queue one or more host-specified write commands specified by an external host system, each of the one or more host-specified write commands specifying a number of pages to be written to the set of non-volatile memory devices of the non-volatile memory system, and (2) in accordance with a determination that throttling is enabled: (3) determining a limit number of pages for a current throttle period in accordance with a throttle rate, the throttle rate being a maximum write rate for executing host-specified write commands (e.g., a maximum average write rate over a period of time that is longer than the throttle period), and (4) during the current throttle period, moving from the holding queue to a pending queue, for execution by the set of non-volatile memory devices, host-specified write commands whose total specified number of pages does not exceed the limit number of pages.

(A2) In some embodiments of the method of A1, the method includes receiving the one or more host-specified write commands from the host system, and placing the one or more host-specified write commands in the holding queue.

(A3) In some embodiments of the method of A1 or A2, the method includes, in accordance with a determination that the total number of pages specified by the one or more host-specified write commands in the holding queue does not exceed the limit number of pages for the current throttle period, moving, during the current throttle period, all the host-specified write commands in the holding queue to the pending queue.

(A4) In some embodiments of the method of any of A1-A3, the method includes, for the current throttle period, updating the limit number of pages in accordance with the throttle rate.

(A5) In some embodiments of the method of any of A1-A4, the method includes, with respect to the current throttle period, adding to the limit number of pages a credit number of pages, determined in accordance with the throttle rate, and subtracting from the limit number of pages the total number of pages specified by the host-specified write commands moved to the pending queue during a corresponding throttle period.

(A6) In some embodiments of the method of any of A1-A5, the method includes, with respect to a future throttle period, determining a limit number of pages for the future throttle period in accordance with a limit number of pages for a throttle period prior to the future throttle period and a credit number of pages for the future throttle period, wherein the credit number of pages for the future throttle period is based on a throttle rate of the future throttle period; and during the future throttle period, moving from the holding queue to the pending queue, for execution by the set of non-volatile memory devices, host-specified write commands whose total specified number of pages exceeds the credit number of pages for the future throttle period, but does not exceed the limit number of pages for the future throttle period.

(A7) In some embodiments of the method of any of A1-A6, the method includes, with respect to each throttle period of a sequence of throttle periods after the current throttle period, in accordance with a determination that throttling is enabled: determining an updated limit number of pages in accordance with the throttle rate; and moving from the holding queue to the pending queue, for execution by the set of non-volatile memory devices, host-specified write commands whose total specified number of pages does not exceed the updated limit number of pages.

(A8) In some embodiments of the method of any of A1-A7, the method includes, prior to a predefined event, disabling throttling; in accordance with a determination that throttling is disabled, moving host-specified write commands to the pending queue for execution; and after the predefined event, enabling throttling.

(A9) In some embodiments of the method of any of A1-A8, the method includes, at predefined times, in accordance with a determination to enable throttling after throttling has been disabled, determining an initial throttle rate in accordance with a write rate during a previous time period during which throttling was disabled; and updating the throttle rate with respect to each throttle period of a sequence of throttle periods after throttling is enabled.

(A10) In some embodiments of the method of A9, updating the throttle rate includes: comparing a current erase rate of the non-volatile memory system with a current end-of-life (EOL) erase rate of the non-volatile memory system; in accordance with a first comparison result from the comparing, reducing the throttle rate; and in accordance with a second comparison result from the comparing, increasing the throttle rate.

(A11) In some embodiments of the method of A10, the method further includes, after increasing the throttle rate, comparing the increased throttle rate with the current EOL erase rate of the non-volatile memory system to generate a third comparison result; and in accordance with the third comparison result, suspending throttling until the first comparison result is satisfied.

(A12) In some embodiments of the method of A11, the method further includes, after suspending throttling, comparing the current erase rate of the non-volatile memory system with the current EOL erase rate of the non-volatile memory system; and resuming throttling in accordance with a predefined comparison result from comparing the current erase rate of the non-volatile memory system with the current EOL erase rate of the non-volatile memory system.

(A13) In some embodiments of the method of any of A1-A12, the holding queue and the pending queue are logical queues; and both the holding queue and the pending queue are part of a single physical queue.

(A14) In some embodiments of the method of any of A1-A12, the holding queue and the pending queue are distinct physical queues.

(A15) In some embodiments of the method of any of A1-A14, the non-volatile memory system includes one or more flash memory devices.

(A16) In another aspect, a non-volatile memory system includes a set of non-volatile memory devices and a storage controller having one or more processors configured to execute instructions in one or more programs. The storage controller is configured to perform operations including: accessing in a holding queue one or more host-specified write commands specified by a host system, each of the one or more host-specified write commands specifying a number of pages to be written to the set of non-volatile memory devices of the non-volatile memory system. In accordance with a determination that throttling is enabled, the storage controller determines a limit number of pages for a current throttle period in accordance with a throttle rate, the throttle rate being a maximum write rate for executing host-specified write commands; and moves, during the current throttle period, from the holding queue to a pending queue, for execution by the set of non-volatile memory devices, host-specified write commands whose total specified number of pages does not exceed the limit number of pages.

(A17) In some embodiments of the non-volatile memory system of A16, the system is configured to operate in accordance with the method of any of A2-A15.

(A18) In some embodiments of the non-volatile memory system of A16, the storage controller includes a throttle module configured to determine whether throttling is enabled, and in accordance with a determination that throttling is enabled, determine the limit number of pages for the current throttle period.

(A19) In some embodiments of the non-volatile memory system of A18, the storage controller includes a write commands determine module to move, during the current throttle period, from the holding queue to a pending queue, for execution by the set of non-volatile memory devices, host-specified write commands whose total specified number of pages does not exceed the limit number of pages.

(A20) In another aspect, a non-transitory computer readable storage medium, stores one or more programs configured for execution by one or more processors of a storage controller in a non-volatile memory system, wherein execution of the one or more programs by the storage controller causes the non-volatile memory system to perform the method of any of A1 to A15.

(A21) In yet another aspect, a non-volatile memory system includes means for accessing in a holding queue one or more host-specified write commands specified by a host system, each of the one or more host-specified write commands specifying a number of pages to be written to the set of non-volatile memory devices of the non-volatile memory system; means for determining a limit number of pages for a current throttle period in accordance with a throttle rate, the throttle rate being a maximum write rate for executing host-specified write commands; and means for moving, during the current throttle period, from the holding queue to a pending queue, for execution by the set of non-volatile memory devices, host-specified write commands whose total specified number of pages does not exceed the limit number of pages, in accordance with a determination that throttling is enabled.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the embodiments described herein.

FIG. 1 is a block diagram illustrating non-volatile memory (NVM) system 100, in accordance with some embodiments. While some example features are illustrated, various other features have not been illustrated for the sake of brevity and so as not to obscure pertinent aspects of the example embodiments disclosed herein. To that end, as a non-limiting example, NVM system 100 includes storage device 120 (also sometimes called an information storage device, or a data storage device, or a memory device), which includes storage controller 124, non-volatile memory (NVM) device(s) (e.g., one or more NVM device(s) 140, 142 such as one or more flash memory devices), optionally includes one or more non-volatile memory (NVM) controllers 130 such as flash controllers, and is used in conjunction with computer system 110. In some embodiments, storage device 120 includes a single NVM device while in other embodiments storage device 120 includes a plurality of NVM devices. In some embodiments, NVM devices 140, 142 include NAND-type flash memory or NOR-type flash memory. Further, in some embodiments, storage controller 124 and/or NVM controllers 130 are solid-state drive (SSD) controllers. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, NVM system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera, and/or any number of supplemental devices to add functionality. In some embodiments, computer system 110 does not have a display and other user interface components.

The one or more NVM controllers 130 are coupled with storage controller 124 through connections 103. Connections 103 are sometimes called data connections, but typically convey commands in addition to data, and optionally convey metadata, error correction information and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device) as components thereof. Furthermore, in some embodiments, storage controller 124, the one or more NVM controllers 130, and NVM devices 140, 142 are embedded in a host device (e.g., computer system 110), such as a mobile device, tablet, other computer or computer controlled device, and the methods described herein are performed, at least in part, by the embedded storage controller.

In some embodiments, storage device 120 includes NVM devices 140, 142 such as flash memory devices (e.g., NVM devices 140-1 through 140-n, and NVM devices 142-1 through 142-k) and NVM controllers 130 (e.g., NVM controllers 130-1 through 130-m). Viewed another way, storage device 120 includes m memory channels, each of which has a set of NVM devices 140 or 142, optionally coupled to a corresponding NVM controller 130, where m is an integer greater than one. However, in some embodiments, two or more memory channels share an NVM controller 130. In yet other embodiments, no NVM controllers 130 are provided and instead the functions described here as being performed by NVM controllers 130 are instead performed by storage controller 124. In all these embodiments, each memory channel has its own distinct set of NVM devices 140 or 142. In a non-limiting example, the number of memory channels in a typical storage device is 8, 16 or 32. In another non-limiting example, the number of NVM devices 140 or 142 per memory channel is typically 8, 16, 32 or 64. Furthermore, in some embodiments, the number of NVM devices 140/142 is different in different memory channels.

In some embodiments, each NVM controller of NVM controllers 130 includes one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. NVM devices 140, 142 may include any number (i.e., one or more) of memory devices including, without limitation, non-volatile semiconductor memory devices, such as flash memory device(s).

For example, flash memory device(s) (e.g., NVM devices 140, 142) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) (e.g., NVM devices 140, 142) can also be configured for relatively smaller-scale applications such as personal flash drives or hard-disk replacements for personal, laptop, and tablet computers. Although flash memory devices and flash controllers are used as an example here, in some embodiments storage device 120 includes other non-volatile memory device(s) and corresponding non-volatile storage controller(s).

In some embodiments, NVM devices 140, 142 are divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

In some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to NVM controllers 130 though connections 103. In some embodiments, storage medium interface 128 includes read and write circuitry, including circuitry capable of providing reading signals to NVM controllers 130 (e.g., reading threshold voltages for NAND-type flash memory). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs or processors or microprocessors or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more processing units (CPUs, also sometimes called processors or microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code (ECC) to produce a codeword, which is subsequently stored in NVM devices 140, 142. When encoded data (e.g., one or more codewords) is read from NVM devices 140, 142, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in NVM devices 140, 142 from computer system 110. The data received by host interface 129 is made available to an encoder (e.g., in additional module(s) 125), which encodes the data to produce one or more codewords. The one or more codewords are made available to storage medium interface 128, which transfers the one or more codewords to NVM devices 140, 142 (e.g., through NVM controllers 130 or storage controller 124) in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from NVM devices 140, 142. Storage controller 124 sends one or more read access commands to NVM devices 140, 142, via storage medium interface 128, to obtain raw read data in accordance with memory locations (addresses) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation (1):

$$\frac{\text{amount of data written to a storage medium}}{\text{amount of data written by a host}} \quad (1)$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
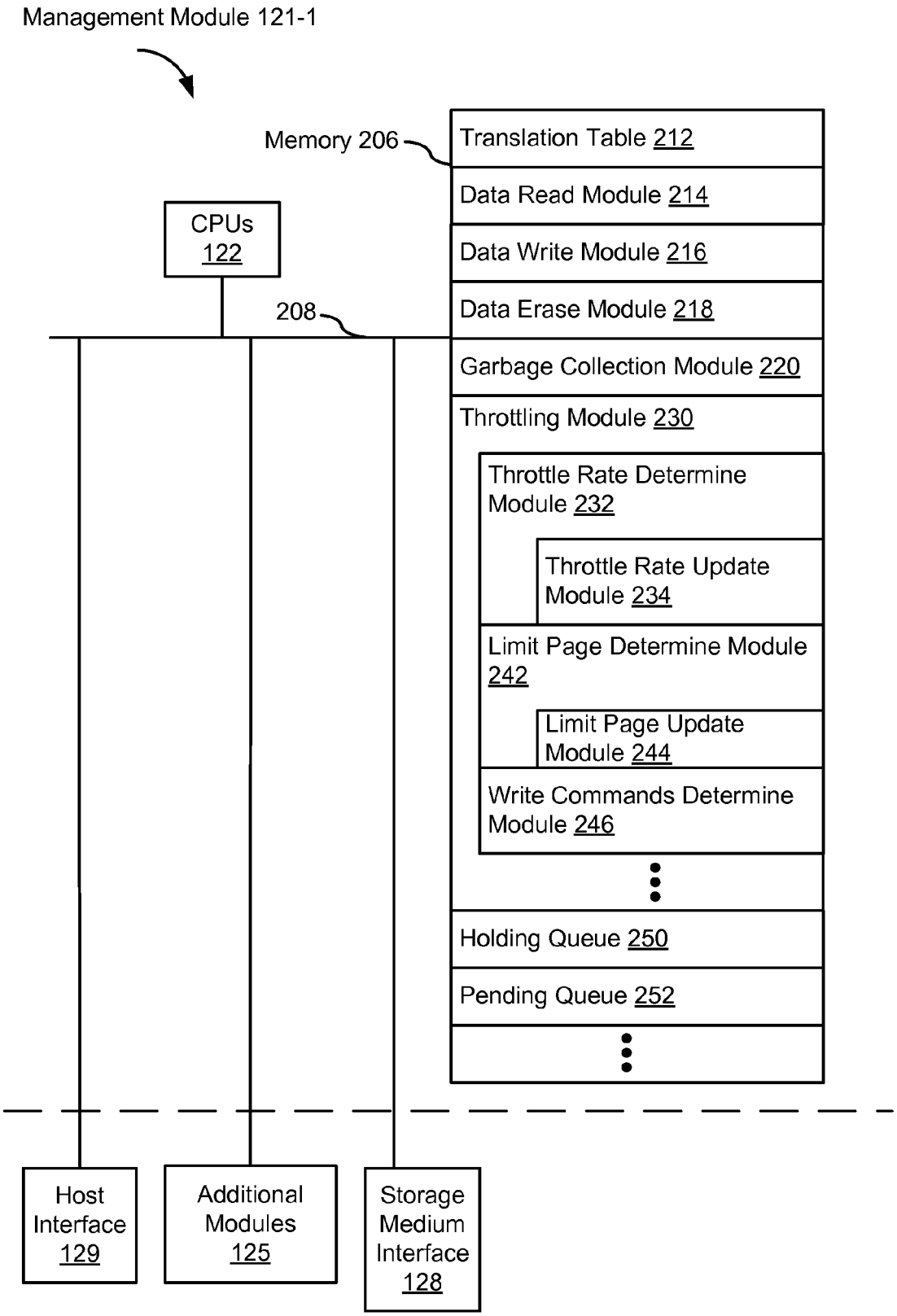
FIG. 2 is a block diagram illustrating an implementation of a management module, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122 for executing modules, programs, and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium interface 128 by the one or more communication buses 208. Memory 206 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:
- translation table 212 that is used for mapping logical addresses to physical addresses;
- data read module 214 that is used for reading data from one or more codewords, pages or blocks in a storage medium (e.g., NVM devices 140, 142, FIG. 1);

data write module 216 that is used for writing data to one or more codewords, pages or blocks in a storage medium (e.g., NVM devices 140, 142, FIG. 1);

data erase module 218 that is used for erasing data from one or more blocks in a storage medium (e.g., NVM devices 140, 142, FIG. 1);

garbage collection module 220 that is used for garbage collection for one or more blocks in a storage medium (e.g., NVM devices 140, 142, FIG. 1);

throttling module 230 that is used for limiting write command execution by storage device 120 (e.g., by NVM devices 140, 142, FIG. 1), including but not limited to:

throttle rate determine module 232 that is used for determining a throttle rate, including but not limited to:

throttle rate update module 234 that is used for updating the throttle rate;

limit page determine module 242 that is used for determining a limit number of pages, to be moved from the holding queue to the pending queue for execution by the set of NVM devices (e.g., NVM devices 140, 142, FIG. 1), in accordance with the throttle rate, including but not limited to:

limit page update module 244 that is used for updating the limit number of pages; and write commands determine module 246 that is used for moving host-specified write commands from the holding queue to the pending queue for execution by the set of NVM devices (e.g., NVM devices 140, 142, FIG. 1), and optionally determines which host-specified write commands to move, subject to the determined limit number of pages;

holding queue 250 that is used for storing host-specified write commands received from a host system (e.g., computer system 110, FIG. 1); and pending queue 252 that is used for storing "pending" write commands waiting for execution by NVM devices (e.g., NVM devices 140, 142, FIG. 1); commands in the pending queue 252 are typically executed without further delay, as soon as the corresponding NVM devices are ready to execute those write commands.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows a management module 121-1 in accordance with some embodiments, FIG. 2 is intended more as functional description of the various features which may be present in management module 121-1, than as a structural schematic of the embodiments described herein. In practice, and as recognized by those of ordinary skill in the art, the programs, modules, and data structures shown separately could be combined and some programs, modules, and data structures could be separated. In some embodiments, one or more of the operations and/or modules of management module 121-1 may instead be performed and/or implemented by management module 121-2. In some embodiments, one or more of the operations and/or modules of management module 121-1 are instead performed and/or implemented by NVM controllers 130. For example, each NVM controller includes a throttling module (e.g., similar to throttling module 230, FIG. 2) for limiting the write execution of corresponding NVM devices based on the throttle rate. In some embodiments, throttling module 230 may be implemented in whole or in part by software, hardware, firmware, or any combination thereof in NVM system 100 (FIG. 1).

Figure 3:
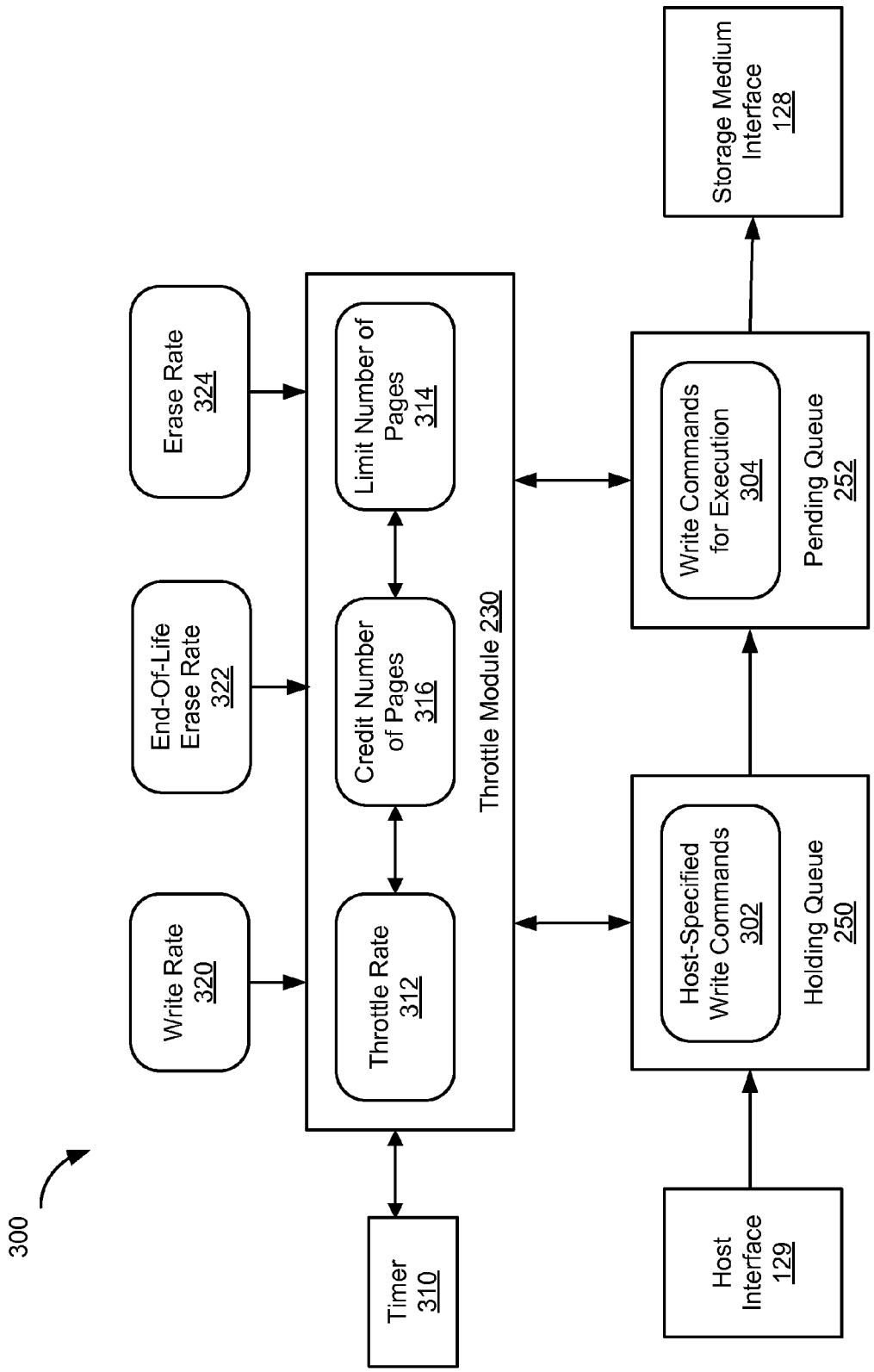
FIG. 3 is a block diagram illustrating a process for limiting write command execution of a non-volatile memory system, in accordance with some embodiments.

FIG. 3 is a block diagram illustrating a process for limiting write command execution of a NVM system (e.g., NVM system 100, FIG. 1), in accordance with some embodiments. In some embodiments, the operations of FIG. 3 are performed by storage device 120, FIG. 1. In some embodiments, storage controller 124 includes timer 310 for counting or tracking passage of time during the execution of one or more memory operations. For example, in some embodiments, timer 310 is used for counting an elapsed time $\Delta T$ since the last time a computed limit number of pages, LP, was updated. In some embodiments, the limit number of pages, LP, is updated periodically, while in other embodiments the limit number LP is updated whenever a predefined condition occurs, such the throttling being enabled, the pending queue being empty and the holding queue being not empty.

In some embodiments, when throttling is enabled, throttling module 230 determines a limit number of pages for each throttle period in a sequence of throttle periods (sometimes called time periods), in accordance with a throttle rate 312. The throttle rate is the maximum average write rate for executing host-specified write commands over a period of time longer than a single throttle period. In some embodiments, throttling module 230 or a component thereof (e.g., limit page determine module 242, FIG. 2) determines a limit number of pages LP 314 in accordance with a credit number, $\Delta LP$, of pages 316, which in turn is determined in accordance with throttle rate 312 for the current throttle period. In some embodiments, the credit number of pages $\Delta LP$ 316 for the current throttle period is determined by equation (2):

$$\Delta LP = \Delta T \times R_T \quad (2)$$

where $\Delta T$ is an elapsed time since the last time the limit number of pages was updated, and $R_T$ is the throttle rate for the current throttle period. In some embodiments, $\Delta T$ is tracked by timer 310.

In some embodiments, throttling module 230 or a component thereof (e.g., limit page update module 244, FIG. 2) updates limit number of pages LP 314 by adding the credit number of pages 316 to the limit number, and by subtracting a number of pages written in the previous time period, as determined by equation (3):

$$LP_{current} = LP_{previous} + \Delta LP - WP \quad (3)$$

where the $LP_{current}$ is the current limit number of pages, for a current time period, $LP_{previous}$ is a prior limit number of pages, for the time period immediately preceding the current time period, $\Delta LP$ is the credit number of pages 316 for the current time period, and WP is the total number of pages specified by the write commands for execution 304 that were moved from holding queue 250 to pending queue 252 in a corresponding time period (e.g., the previous time period if the limit number of pages is being updated at the beginning of the current time period, or the current time period if the limit number of pages is being updated at the end of the current time period).

The limit number of pages LP increases from one time period to the next when the host write rate is slower than the current throttle rate, because the number of pages to be written by write commands in holding queue 250 is less than the credit number of pages added to the limit number of pages. On the other hand, when the host write rate is greater than the current throttle rate, the limit number of pages decreases from one time period to the next, but does not fall below its lowest possible value, which is the credit number of pages for the current time period. In this way, after one or more time periods in which the host write rate is slower than the current throttle rate, the host can, at least temporarily, write data at a rate that is faster than the throttle rate, until the cumulative average host write rate reaches the throttle rate.

In some embodiments, throttling module 230 or a component thereof (e.g., write commands determine module 246, FIG. 2) determines which host-specified write commands 302 in holding queue 250 to move from holding queue 250 to pending queue 252 for execution. The host-specified write commands that are moved are called "write commands for execution" 304. Write commands for execution 304 in pending queue 252 are transmitted via storage medium interface 128 to be executed by NVM devices 140 and/or 142. Typically, all host-specified write commands moved to pending queue 252 during a current time period will be transmitted to NVM devices 140, 142 for execution before the end of the current time period. More generally, the capacity of NVM devices 140, 142 in storage device 120 to execute write commands is greater than the throttle rate.

In some embodiments, which write commands to include in write commands for execution 304 is determined in accordance with limit number of pages LP 314 for the current throttle period. In particular, the total number of pages WP to be written by write commands for execution 304 (i.e., host-specified write commands transferred to pending queue 252) does not exceed the limit number of pages LP 314 for the current throttle period. In a more specific example, host-specified write commands in the holding queue are selected sequentially, from oldest to newest, for inclusion in the host-specified write commands to be moved to pending queue 252 until either the holding queue is empty, or the total number of pages WP to be written would exceed the limit number of pages for the current time period. In some embodiments, a different, more complex selection methodology may be used to determine which host-specified write command to transfer from holding queue 250 to pending queue 252.

In some embodiments, throttling module 230 or a component thereof (e.g., throttle rate update module 234, FIG. 2) updates throttle rate 312 by comparing end-of-life (EOL) erase rate 322 of NVM system 100 with erase rate 324 of NVM system 100. In accordance with a determination that erase rate 324 is greater than or equal to EOL erase rate 322, throttle rate update module 234 reduces throttle rate 312. In accordance with a determination that erase rate 324 is less than EOL erase rate 322, throttle rate update module 234 increases throttle rate 312. Processes for updating throttle rate 312 are discussed in more detail below, with respect to operations 420-426 of FIG. 4C.

FIGS. 4A-4D illustrate a flowchart representation of a method 400 of operation in a NVM system having a set of NVM devices, in accordance with some embodiments. At least in some embodiments, method 400 is performed by a storage device (e.g., storage device 120, FIG. 1) or one or more components of the storage device (e.g., storage controller 124, NVM controllers 130 and/or NVM devices 140, 142, FIG. 1), wherein the storage device is operatively coupled with a host system (e.g., computer system 110, FIG. 1). In some embodiments, method 400 is governed by instructions that are stored in a non-transitory computer readable storage medium and that are executed by one or more processors of a device, such as the one or more processing units (CPUs) 122 of management module 121-1, shown in FIGS. 1 and 2. In some embodiments, method 400 is performed by a NVM system (e.g., NVM system 100, FIG. 1) or one or more components of the NVM system (e.g., computer system 110 and/or storage device 120, FIG. 1). In some embodiments, some of the operations of method 400 are performed at a host (e.g., computer system 110, FIG. 1) and information is transmitted to a storage device (e.g., storage device 120, FIG. 1). In some embodiments, method 400 is governed, at least in part, by instructions that are stored in a non-transitory computer readable storage medium and that are executed by one or more processors of a host (not shown in FIG. 1). For ease of explanation, method 400 is described below as performed by a storage device (e.g., storage device 120, FIG. 1). However, those skilled in the art will appreciate that in other embodiments, one or more of the operations described in method 400 are performed by a host (e.g., computer system 110, FIG. 1).

Figure 4A:
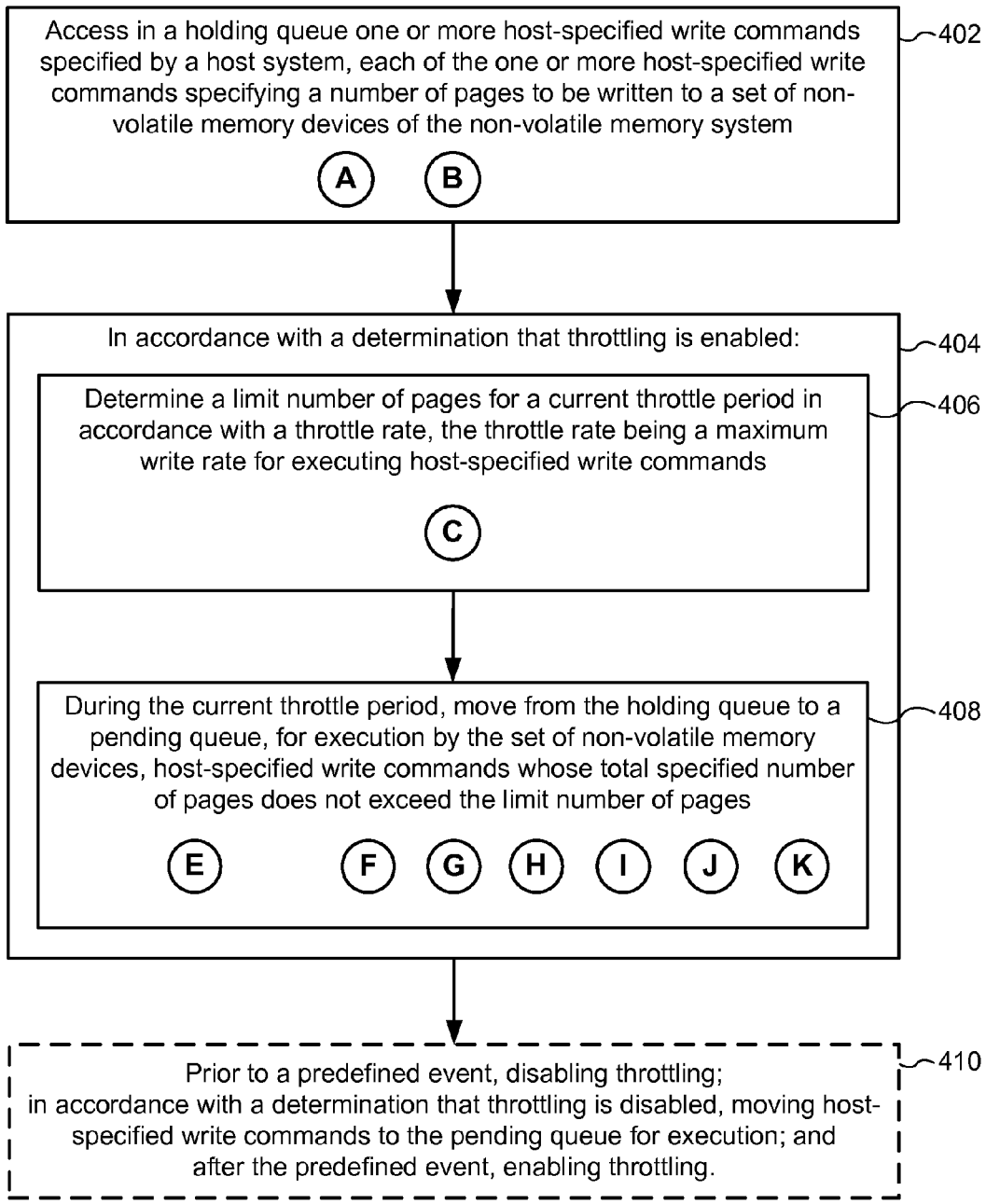
FIGS. 4A-4D illustrate a flowchart diagram of a method of managing a non-volatile memory system, in accordance with some embodiments.

Referring to FIG. 4A, a storage device (e.g., storage device 120, FIG. 1) of a NVM system (e.g., NVM system 100, FIG. 1) accesses (402) in a holding queue (e.g., holding queue 250, FIGS. 2-3) one or more host-specified write commands (e.g., host-specified write commands 302, FIG. 3) specified by a host system (e.g., computer system 110, FIG. 1). Each of the one or more host-specified write commands specifying a number of pages to be written to the set of NVM devices (e.g., NVM devices 140, 142, FIG. 1) of the NVM system. In some embodiments, a NVM device of the plurality of NVM devices includes a chip (e.g., a flash memory chip having two or more flash memory die). In some embodiments, a NVM device of the plurality of NVM devices includes a memory unit that can be programmed in parallel with other memory units (e.g., a plane).

Figure 4B:
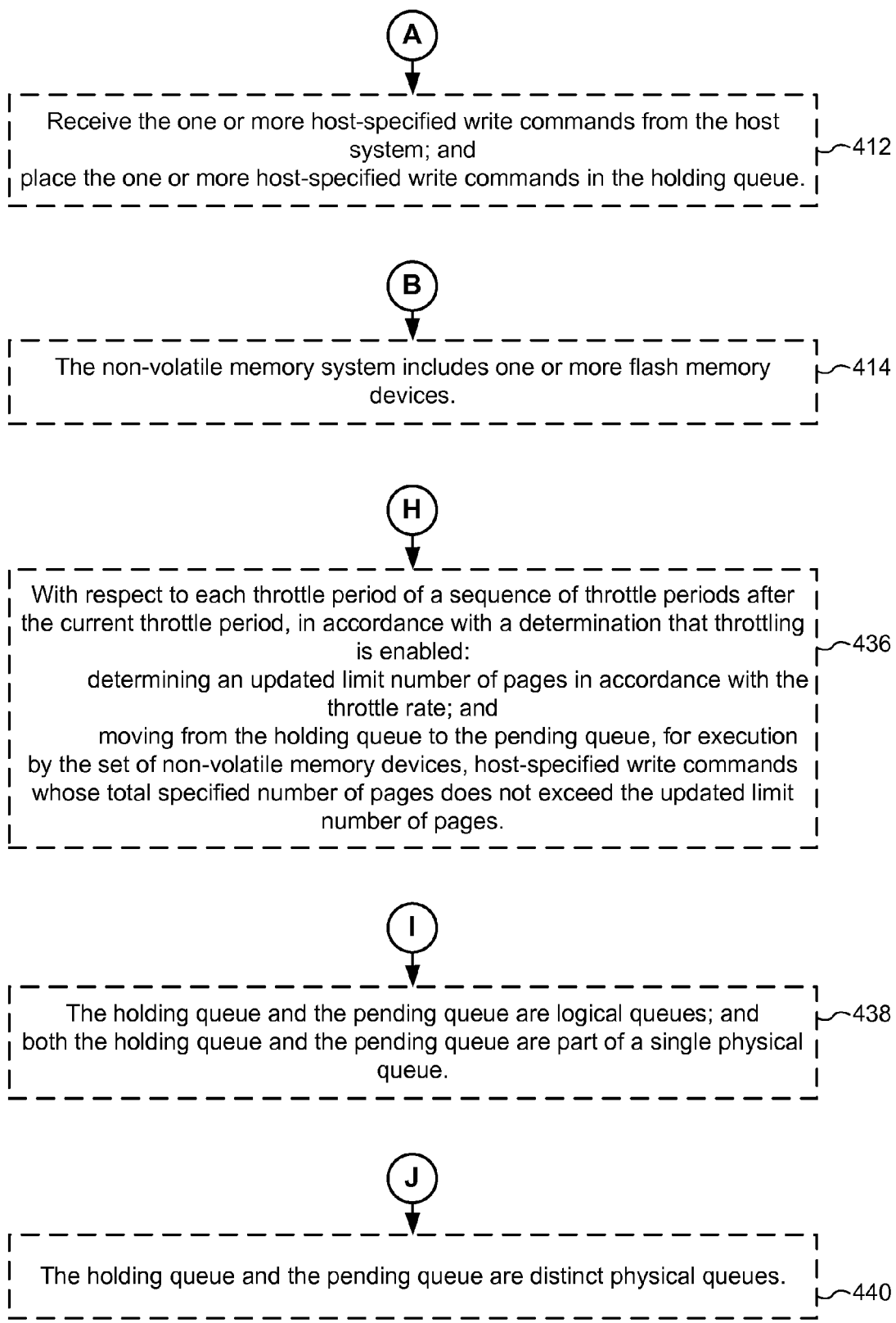

Referring to FIG. 4B, the storage device receives (412) the one or more host-specified write commands from the host system, and places (412) the one or more host-specified write commands in the holding queue.

In some embodiments, the NVM system includes (414) one or more flash memory devices. In some embodiments, the NVM system includes a storage medium (e.g., NVM devices 140, 142, FIG. 1), and the storage medium includes one or more non-volatile storage devices, such as flash memory devices. In some embodiments, the storage medium is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., NVM devices 140, 142, FIG. 1) includes NAND-type flash memory or NOR-type flash memory. In other embodiments, the storage medium comprises one or more other types of non-volatile storage devices.

Referring back to FIG. 4A, In accordance with a determination that throttling is enabled (404), the storage device determines (406) a limit number of pages (e.g., limit number of pages (LP) 314, FIG. 3) for a current throttle period (sometimes herein called the current time period) in accordance with a throttle rate (e.g., throttle rate 312, FIG. 3). In some embodiments, a limit page determine module (e.g., limit page determine module 242, FIG. 2) determines the limit number of pages for the current throttle period. The throttle rate is a maximum write rate for executing host-specified write commands. In some embodiments, the limit number of pages for the current throttle period is determined by equation (3) as discussed with respect to FIG. 3.

Figure 4C:
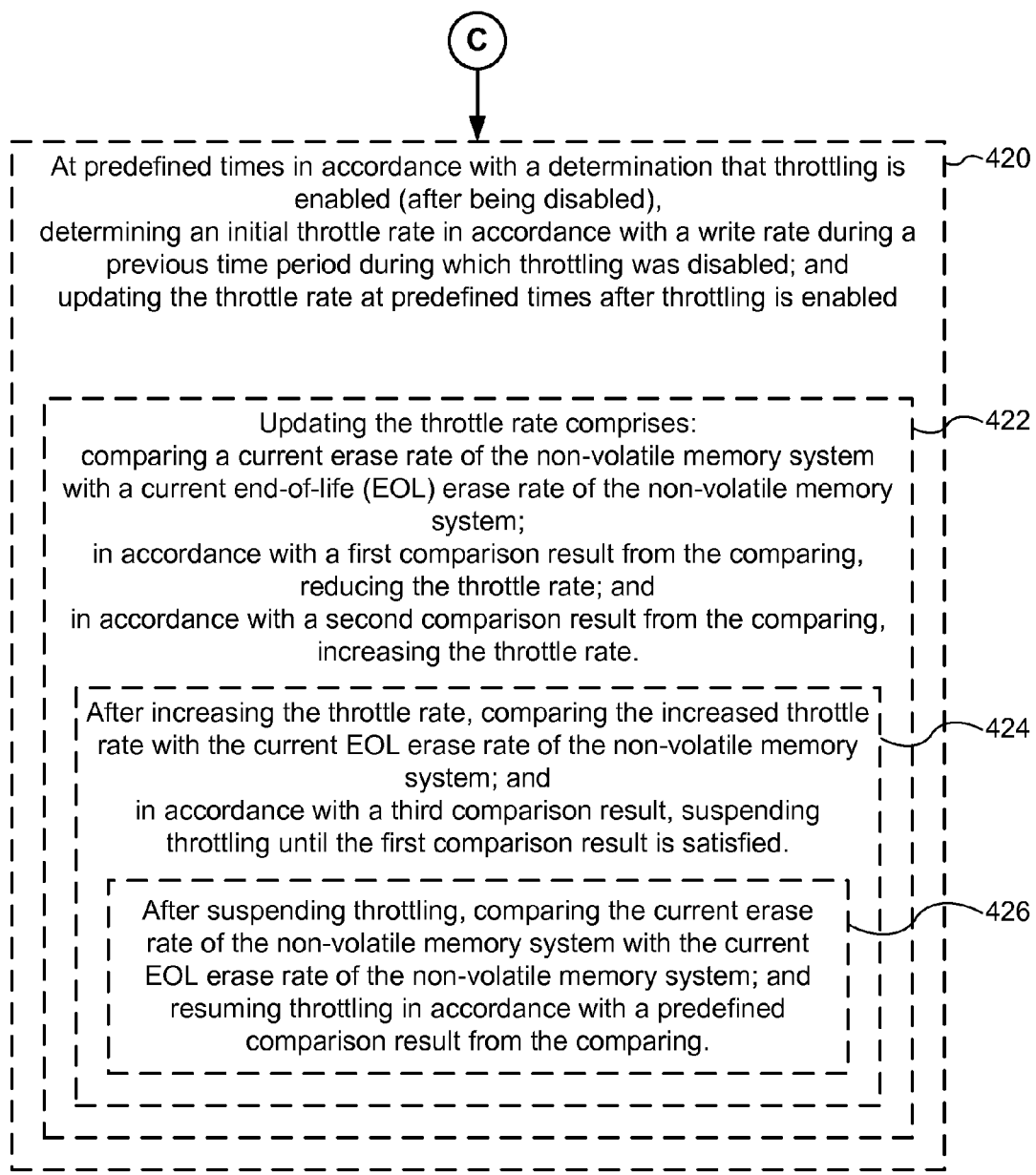

Referring to FIG. 4C, in some embodiments, at predefined times in accordance with a determination that throttling is enabled, a throttle rate determine module of the storage device (e.g., throttle rate determine module 232, FIG. 2) determines (420) an initial value for the throttle rate in accordance with the write rate (e.g., write rate 320, FIG. 3) in a previous time period during which throttling was disabled. For example, the initial value for the throttle rate is set to a predefined percentage of the average write rate during the previous time period (e.g., 95% of the average write rate during a previous time period of 1 minute, 1 hour, or 1 day, during which throttling was disabled).

In some embodiments, a throttle rate update module of the storage device (e.g., throttle rate update module 234, FIG. 2) updates (420) the throttle rate at predefined times after throttling is enabled. In some embodiments, the throttle rate is updated periodically, such as once per day.

In some embodiments, updating the throttle rate includes comparing (422) a current erase rate of the NVM system (e.g., erase rate 324, FIG. 3) with a current end-of-life (EOL) erase rate of the NVM system (e.g., EOL erase rate 322, FIG. 3). In some embodiments, the current EOL erase rate is determined by the following equation (4):

$$\frac{\text{remaining erases per block}}{\text{remaining days according to the designed } EOL} \quad (4)$$

where the "remaining erases per block" is determined in accordance with equation (5):

remaining erases per block=EOL erases per block− current erases per block    (5)

where "EOL erases per block" is a value that has been determined through measurements performed on memory media of the same type(s) as that used in storage device 120, and "current erases per block" is the average number of erases per block that have occurred during the lifetime of the storage media in storage device 120. In some embodiments, "EOL erases per block" is defined to be an average number or a predicted average number of erases per block that can be performed before performance of the block fails to meet predefined criteria (e.g., a bit error rate below a threshold, the ability to successfully store new data using no more than a threshold number of program cycles).

In accordance with a first comparison result from the comparing process, the throttle rate update module reduces (422) the throttle rate. In some embodiments, the first comparison result is: the current erase rate is greater than or equal to the current EOL erase rate. In some embodiments, in accordance with the first comparison result, the throttle rate is reduced by a predefined amount, where the predefined amount is in the range from about 3% of the current throttle rate to about 10% of the current throttle rate. In some embodiments, when the throttle rate has been reduced to a predetermined low throttle rate limit (e.g., 128 4 KB pages/s or 0.5 MB/s), also called a predefined minimum throttle rate, the throttle rate is maintained at the low throttle rate limit without being further reduced. For example, in some embodiments, in accordance with the first comparison result, the throttle rate is reduced by about 5% (e.g., an amount between 4.5% and 5.5%).

In accordance with a second comparison result from the comparing process, the throttle rate update module increases (422) the throttle rate. In some embodiments, the second comparison result is: the current erase rate is less than the current EOL erase rate. In some embodiments, the throttle rate is increased by a predefined amount in the range from about 3% to about 10%. For example, in some embodiments, in accordance with the second comparison result, the throttle rate is increased by about 5% (e.g., an amount between 4.5% and 5.5%).

In some embodiments, after increasing the throttle rate, the storage device compares (424) the increased throttle rate with the current EOL erase rate of the NVM system. In accordance with a third comparison result, the storage device suspends (424) throttling until the first comparison result (e.g., when the current erase rate is greater than or equal to the current EOL erase rate) is satisfied. In some embodiments, the third comparison result is: the increased throttle rate, converted into units comparable to the EOL erase rate, is greater than the current EOL erase rate. In some embodiments, the suspension (424) of the throttling is performed when the throttle rate is greater than the current EOL erase rate, and the current EOL erase rate is greater than the current erase rate. In some embodiments, for purposes of this comparison, the throttle rate, expressed in units of pages written per unit of time, is divided by the number of pages per erase block to produce a throttle rate expressed in units of blocks erased per unit of time. In some other embodiments, for purposes of this comparison, the throttle rate, expressed in units of pages written per unit of time, is divided by the number of pages per erase block and multiplied by a write amplification factor to produce a throttle rate expressed in units of blocks erased per unit of time.

In some embodiments, after suspending throttling, the storage device compares (426) the current erase rate of the NVM system with the current EOL erase rate of the NVM system. In accordance with a predefined comparison result from the comparing, the storage device resumes (426) throttling. In some embodiments, the comparison result is predefined to be: the current erase rate is greater than or equal to the current EOL erase rate. In some embodiments, resuming throttle includes applying an adjusted throttle rate during the current or next throttle period, wherein the adjusted throttle rate is determined by reducing a write rate determined in a previous write period during which throttling was disabled. In some embodiments, the adjusted throttle rate is determined by reducing the write rate of the previous write period (e.g., 1 minute, 1 hour, or 1 day) by a predefined amount in a range from about 3% to about 10%.

Referring back to 4A, during the current throttle period, the storage device moves (408) from the holding queue (e.g., holding queue 250, FIGS. 2-3) to a pending queue (e.g., pending queue 252, FIGS. 2-3), for execution by the set of NVM devices, host-specified write commands (e.g., write commands for execution 304, FIG. 3) whose total specified number of pages does not exceed the limit number of pages. The host-specified commands in the pending queue are then executed by the set of NVM devices. From a more detailed viewpoint, the host-specified commands in the pending queue are transferred by storage controller 124 from the pending queue to the NVM devices (i.e., each command is transferred to the NVM(s) specified by address portions of the command), which then execute those commands.

Figure 4D:
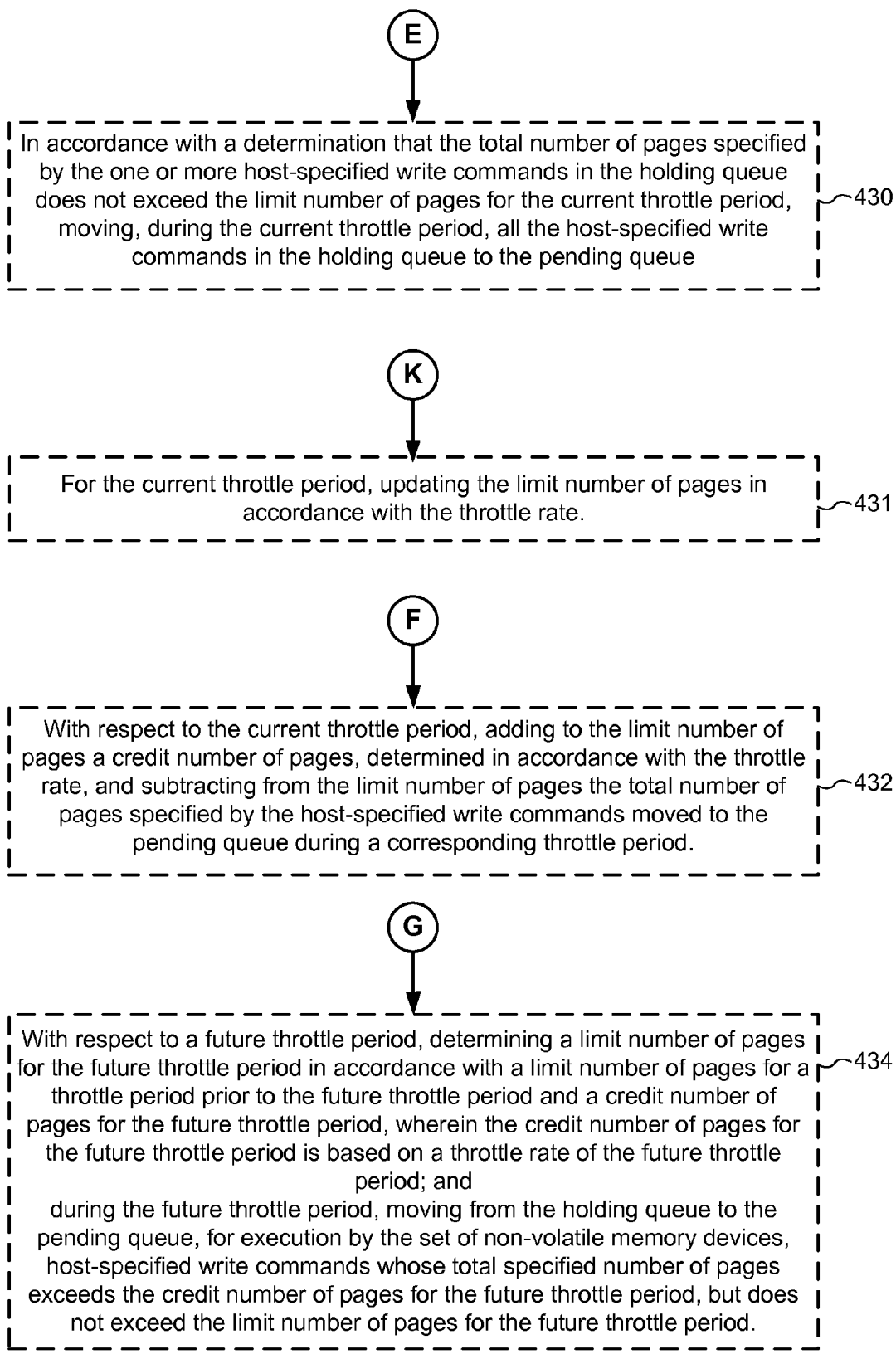

Referring to FIG. 4D, in some embodiments, the storage device determines whether the total number of pages specified by the one or more host-specified write commands in the holding queue exceeds the limit number of pages. In accordance with a determination that the total number of pages specified by the one or more host-specified write commands in the holding queue does not exceed the limit number of pages for the current throttle period, the storage device moves (430) all the host-specified write commands in the holding queue to the pending queue during the current throttle period.

In some embodiments, for the current throttle period, the storage device updates (431) the limit number of pages in accordance with the throttle rate. In some embodiments, a limit page update module (e.g., limit page update module 244, FIG. 2) updates the limit number of pages in accordance with the throttle rate. Examples of how to update the limit number of pages in accordance with the throttle rate are provided above in the discussion of FIG. 3.

In some embodiments, with respect to the current throttle period, updating the limit number of pages includes: at least once per throttle period, adding (432) a credit number of pages (e.g., CNP 316, FIG. 3) to the limit number of pages, and subtracting (432) from the limit number of pages the total number (WP) of pages specified by the host-specified write commands moved to the pending queue during a corresponding throttle period (i.e., the current throttle period or the prior throttle period, depending on whether the limit number of pages is updated at the beginning or end of each throttle period). In some embodiments, the limit number of pages is updated by equation (3) as shown above with respect to FIG. 3. In some embodiments, the limit number of pages increases over multiple throttle periods, when the rate of host writes is slower than the throttle rate, i.e., the total number (WP) of pages specified by the host-specified write commands in each period is less than the credit number of pages (CNP) for that period.

In some embodiments, with respect to a future throttle period, the storage device determines (434) a limit number of pages for the future throttle period in accordance with a limit number of pages for a throttle period prior to the future period and a credit number of pages for the future throttle period. In some embodiments, the credit number of pages for the future throttle period is based on a throttle rate of the future throttle period. In some circumstances (e.g., the limit number of pages exceeds the throttle rate, and the holding queue holds write commands specifying more pages than the throttle rate), during the future throttle period, the storage device moves (434) from the holding queue to the pending queue, for execution by the set of NVM devices, host-specified write commands whose total specified number of pages exceeds the credit number of pages for the future throttle period, but does not exceed the limit number of pages for the future throttle period.

Referring to FIG. 4B, in some embodiments, with respect to each throttle period of a sequence of throttle periods (sometimes herein called a sequence of time periods) after the current throttle period, in accordance with a determination that throttling is enabled, the storage device determines (436) an updated limit number of pages in accordance with the throttle rate. The storage device moves (436) from the holding queue to the pending queue, for execution by the set of NVM devices, host-specified write commands whose total specified number of pages does not exceed the updated limit number of pages.

In some embodiments, the holding queue (e.g., holding queue 250, FIGS. 2-3) and the pending queue (e.g., pending queue 252, FIGS. 2-3) are logical queues (438). In some embodiments, both the holding queue and the pending queue are part of a single physical queue (438). In some embodiments, the holding queue and the pending queue are distinct physical queues (440).

Referring back to FIG. 4A, in some embodiments, prior to a predefined event, the storage device disables (410) throttling. In accordance with a determination that throttling is disabled, the storage device moves (410) host-specified write commands directly to the pending queue for execution, bypassing the holding queue. In some embodiments, after the predefined event, the storage device enables (410) throttling. In some embodiments, the predefined event (sometime called a predefined throttle start event) includes an occurrence when one or more metrics of the storage device reach respective predetermined thresholds. For example, the predefined event includes an occurrence when wear metrics of the storage device, e.g., current used P/E (program-erase) cycle counts, reach a predetermined threshold, e.g., 50% of the end-of-life (EOL) P/E cycle counts. In some embodiments, the predefined event includes an occurrence when the current power-on time reaches a predetermined threshold, such as 6 months.

As discussed in this application, when the host write rate is below the throttle rate, or when it is before a predefined throttle start event that marks when throttling is started, method 400 provides minimum impact on data write execution and system workloads. After the predefined throttle start event, when host write rate is above the throttle rate, host write execution is effectively and efficiently limited by enabling throttling. When throttling is enabled, the storage device initially stores host-specified write commands in the holding queue (as described above with respect to operation 412), and moves the host-specified write commands from the holding queue to the pending queue using the mechanisms and methodologies described above. More generally, when the throttling is enabled, the buffering of write commands through a holding queue and pending queue smoothes the rate of write execution to a consistent level.

It will be understood that, although the terms "first," "second," etc. may be used herein to describe various elements, these elements should not be limited by these terms. These terms are only used to distinguish one element from another. For example, a first comparison result could be termed a second comparison result, and, similarly, a second comparison result could be termed a first comparison result, without changing the meaning of the description, so long as all occurrences of the "first comparison result" are renamed consistently and all occurrences of the "second comparison result" are renamed consistently. The first comparison result and the second comparison result are not the same comparison result.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of operation in a non-volatile memory system having a set of non-volatile memory devices, comprising:
   accessing in a holding queue one or more host-specified write commands specified by a host system, each of the one or more host-specified write commands specifying a number of pages to be written to the set of non-volatile memory devices of the non-volatile memory system;
   in accordance with a determination that throttling is enabled:
      determining a limit number of pages for a current throttle period in accordance with a throttle rate, the throttle rate being a maximum write rate for executing host-specified write commands; and
      during the current throttle period, moving from the holding queue to a pending queue, for execution by the set of non-volatile memory devices, host-specified write commands whose total specified number of pages does not exceed the limit number of pages; and
   transmitting respective host-specified write commands from the pending queue to respective non-volatile memory devices in the set of non-volatile memory devices in accordance with the respective non-volatile memory devices being ready to execute the respective host-specified write commands.

2. The method of claim 1, including:
   receiving the one or more host-specified write commands from the host system; and
   placing the one or more host-specified write commands in the holding queue.

3. The method of claim 1, including:
   in accordance with a determination that the total number of pages specified by the one or more host-specified write commands in the holding queue does not exceed the limit number of pages for the current throttle period, moving, during the current throttle period, all the host-specified write commands in the holding queue to the pending queue.

4. The method of claim 1, including:
   for the current throttle period, updating the limit number of pages in accordance with the throttle rate.

5. The method of claim 1, including:
   with respect to the current throttle period, adding to the limit number of pages a credit number of pages, determined in accordance with the throttle rate, and subtracting from the limit number of pages the total number of pages specified by the host-specified write commands moved to the pending queue during a corresponding throttle period.

6. The method of claim 1, including:
   with respect to a future throttle period, determining a limit number of pages for the future throttle period in accordance with a limit number of pages for a throttle period prior to the future throttle period and a credit number of pages for the future throttle period, wherein the credit number of pages for the future throttle period is based on a throttle rate of the future throttle period; and
   during the future throttle period, moving from the holding queue to the pending queue, for execution by the set of non-volatile memory devices, host-specified write commands whose total specified number of pages exceeds the credit number of pages for the future throttle period, but does not exceed the limit number of pages for the future throttle period.

7. The method of claim 1, further comprising,
   with respect to each throttle period of a sequence of throttle periods after the current throttle period, in accordance with a determination that throttling is enabled:
      determining an updated limit number of pages in accordance with the throttle rate; and
      moving from the holding queue to the pending queue, for execution by the set of non-volatile memory devices, host-specified write commands whose total specified number of pages does not exceed the updated limit number of pages.

8. The method of claim 1, further comprising:
   prior to a predefined event, disabling throttling;
   in accordance with a determination that throttling is disabled:
      moving host-specified write commands to the pending queue for execution; and
   after the predefined event, enabling throttling.

9. The method of claim 1, further comprising:
   at predefined times, in accordance with a determination to enable throttling after throttling has been disabled, determining an initial throttle rate in accordance with a write rate during a previous time period during which throttling was disabled; and
   updating the throttle rate with respect to each throttle period of a sequence of throttle periods after throttling is enabled.

10. The method of claim 1, further comprising updating the throttle rate, wherein updating the throttle rate comprises:
   comparing a current erase rate of the non-volatile memory system with a current end-of-life (EOL) erase rate of the non-volatile memory system, wherein the current EOL erase rate is a rate determined in accordance with a remaining average number of erases per non-volatile memory unit that can be performed before end of life of the non-volatile memory system;
   in accordance with a first comparison result from the comparing, reducing the throttle rate; and in accordance with a second comparison result from the comparing, increasing the throttle rate.

11. The method of claim 10, further comprising:
after increasing the throttle rate, comparing the increased throttle rate with the current EOL erase rate of the non-volatile memory system to generate a third comparison result; and
in accordance with the third comparison result, suspending throttling until the first comparison result is satisfied.

12. The method of claim 11, further comprising:
after suspending throttling, comparing the current erase rate of the non-volatile memory system with the current EOL erase rate of the non-volatile memory system; and
resuming throttling in accordance with a predefined comparison result from comparing the current erase rate of the non-volatile memory system with the current EOL erase rate of the non-volatile memory system.

13. The method of claim 1, wherein:
the holding queue and the pending queue are logical queues; and
both the holding queue and the pending queue are part of a single physical queue.

14. The method of claim 1, wherein the holding queue and the pending queue are distinct physical queues.

15. The method of claim 1, wherein the non-volatile memory system includes one or more flash memory devices.

16. A non-volatile memory system, comprising:
a set of non-volatile memory devices; and
a storage controller having one or more processors configured to execute instructions in one or more programs, wherein the storage controller is configured to perform operations comprising:
    accessing in a holding queue one or more host-specified write commands specified by a host system, each of the one or more host-specified write commands specifying a number of pages to be written to the set of non-volatile memory devices of the non-volatile memory system;
    in accordance with a determination that throttling is enabled:
        determining a limit number of pages for a current throttle period in accordance with a throttle rate, the throttle rate being a maximum write rate for executing host-specified write commands; and
        moving, during the current throttle period, from the holding queue to a pending queue, for execution by the set of non-volatile memory devices, host-specified write commands whose total specified number of pages does not exceed the limit number of pages; and
    transmitting respective host-specified write commands from the pending queue to respective non-volatile memory devices in the set of non-volatile memory devices in accordance with the respective non-volatile memory devices being ready to execute the respective host-specified write commands.

17. The non-volatile memory system of claim 16, wherein the storage controller includes a throttle module configured to determine whether throttling is enabled, and in accordance with a determination that throttling is enabled, determine the limit number of pages for the current throttle period.

18. The non-volatile memory system of claim 16, wherein the storage controller includes a throttle rate determine module configured to determine the throttle rate.

19. The non-volatile memory system of claim 16, wherein the storage controller includes a throttle rate update module configured to update the throttle rate.

20. The non-volatile memory system of claim 16, wherein the storage controller includes a limit page update module configured to update the limit number of pages.

21. The non-volatile memory system of claim 16, wherein the storage controller includes a write commands determine module to move, during the current throttle period, from the holding queue to a pending queue, for execution by the set of non-volatile memory devices, host-specified write commands whose total specified number of pages does not exceed the limit number of pages.

22. The non-volatile memory system of claim 16, wherein the storage controller is configured to perform operations comprising:
in accordance with a determination that the total number of pages specified by the one or more host-specified write commands in the holding queue does not exceed the limit number of pages for the current throttle period, moving, during the current throttle period, all the host-specified write commands in the holding queue to the pending queue.

23. A non-transitory computer readable storage medium, storing one or more programs configured for execution by one or more processors of a non-volatile memory system, the one or more programs including instructions for performing operations comprising:
    accessing in a holding queue one or more host-specified write commands specified by a host system, each of the one or more host-specified write commands specifying a number of pages to be written to the set of non-volatile memory devices of the non-volatile memory system;
    in accordance with a determination that throttling is enabled:
        determining a limit number of pages for a current throttle period in accordance with a throttle rate, the throttle rate being a maximum write rate for executing host-specified write commands; and
        moving, during the current throttle period, from the holding queue to a pending queue, for execution by the set of non-volatile memory devices, host-specified write commands whose total specified number of pages does not exceed the limit number of pages; and
    transmitting respective host-specified write commands from the pending queue to respective non-volatile memory devices in the set of non-volatile memory devices in accordance with the respective non-volatile memory devices being ready to execute the respective host-specified write commands.

24. The non-transitory computer readable storage medium of claim 23, wherein the one or more programs include instructions for performing operations comprising:
in accordance with a determination that the total number of pages specified by the one or more host-specified write commands in the holding queue does not exceed the limit number of pages for the current throttle period, moving, during the current throttle period, all the host-specified write commands in the holding queue to the pending queue.

* * * * *